United States Patent
Niem et al.

(10) Patent No.: US 8,918,277 B2
(45) Date of Patent: Dec. 23, 2014

(54) METHOD AND DEVICE FOR RECOGNIZING ROAD SIGNS IN THE VICINITY OF A VEHICLE AND FOR SYNCHRONIZATION THEREOF TO ROAD SIGN INFORMATION FROM A DIGITAL MAP

(75) Inventors: Wolfgang Niem, Hildesheim (DE); Philipp Ibele, Senden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/313,853

(22) Filed: Dec. 7, 2011

(65) Prior Publication Data

US 2012/0150428 A1 Jun. 14, 2012

(30) Foreign Application Priority Data

Dec. 8, 2010 (DE) .......................... 10 2010 062 633

(51) Int. Cl.
*G08G 1/0967* (2006.01)
*G01C 21/26* (2006.01)
*G01C 21/00* (2006.01)
*G06K 9/00* (2006.01)
*G01C 21/36* (2006.01)

(52) U.S. Cl.
CPC ...... *G08G 1/096716* (2013.01); *G06K 9/00818* (2013.01); *G08G 1/096758* (2013.01); *G08G 1/096783* (2013.01); *G01C 21/3602* (2013.01); *G06K 9/00791* (2013.01); *G06T 2207/30252* (2013.01)
USPC ............ 701/409; 340/905; 701/28; 701/408; 701/400; 701/523; 701/532; 382/104; 382/113; 382/165; 382/181; 382/209

(58) Field of Classification Search
None
See application file for complete search history.

(56) References Cited

U.S. PATENT DOCUMENTS

| | | | | |
|---|---|---|---|---|
| 6,055,042 | A * | 4/2000 | Sarangapani | 356/4.01 |
| 6,453,056 | B2 * | 9/2002 | Laumeyer et al. | 382/104 |
| 6,560,529 | B1 * | 5/2003 | Janssen | 701/469 |
| 7,970,529 | B2 * | 6/2011 | Mori et al. | 701/117 |
| 8,180,527 | B2 * | 5/2012 | Mueller-Schneiders et al. | 701/36 |
| 2005/0086051 | A1 * | 4/2005 | Brulle-Drews | 704/7 |
| 2006/0100774 | A1 * | 5/2006 | Barkowski et al. | 701/200 |
| 2007/0050115 | A1 * | 3/2007 | Discenzo et al. | 701/50 |
| 2007/0100547 | A1 * | 5/2007 | Chang | 701/213 |

(Continued)

FOREIGN PATENT DOCUMENTS

| CN | 1748123 | 3/2006 |
|---|---|---|
| CN | 101842823 | 9/2010 |

(Continued)

*Primary Examiner* — Calvin Cheung
*Assistant Examiner* — Kevin P Mahne
(74) *Attorney, Agent, or Firm* — Kenyon & Kenyon LLP

(57) ABSTRACT

A method for recognizing road signs in the vicinity of a vehicle and for synchronization thereof to road sign information from a digital map where, in the case of a recognition of road signs, road-sign recognition data are generated, navigation data being provided for localizing the vehicle in digital map data, and the road-sign recognition data being synchronized to the map data. To be able to provide unambiguous and the most accurate possible and thus improved road sign information to be output to the driver in the context of such a method, in the case of a discrepancy between the map data and the road-sign recognition data, the decision is made with the aid of reliability factors for the camera and map as to whether the data from the digital map or the road-sign recognition data are output in the vehicle.

26 Claims, 1 Drawing Sheet

(56) References Cited

U.S. PATENT DOCUMENTS

| | | |
|---|---|---|
| 2008/0056535 A1* | 3/2008 | Bergmann et al. ............ 382/103 |
| 2008/0162036 A1* | 7/2008 | Breed ............................ 701/207 |
| 2009/0005980 A1* | 1/2009 | Nakao et al. .................. 701/210 |
| 2009/0024321 A1* | 1/2009 | Bando et al. .................. 701/210 |
| 2009/0074249 A1* | 3/2009 | Moed et al. ................... 382/104 |
| 2009/0118994 A1* | 5/2009 | Mori et al. .................... 701/117 |
| 2009/0172527 A1* | 7/2009 | Buecker et al. ............... 715/700 |
| 2009/0177378 A1* | 7/2009 | Kamalski et al. ............. 701/207 |
| 2010/0185388 A1* | 7/2010 | Horvitz ......................... 701/204 |
| 2010/0198488 A1* | 8/2010 | Groitzsch et al. ............. 701/117 |
| 2011/0082640 A1* | 4/2011 | Bohme et al. ................. 701/201 |

FOREIGN PATENT DOCUMENTS

| | | | | |
|---|---|---|---|---|
| DE | 102007015926 A1 * | 9/2008 | ............. | G08G 1/09 |
| DE | 102007048842 | 9/2008 | | |
| EP | 1826736 | 8/2007 | | |
| WO | WO 0016214 | 3/2000 | | |

* cited by examiner

METHOD AND DEVICE FOR RECOGNIZING ROAD SIGNS IN THE VICINITY OF A VEHICLE AND FOR SYNCHRONIZATION THEREOF TO ROAD SIGN INFORMATION FROM A DIGITAL MAP

CROSS REFERENCE

The present application claims the benefit under 35 U.S.C. §119 of German Patent No. DE 102010062633.3, filed on Dec. 8, 2010, which is expressly incorporated herein by reference in its entirety.

FIELD OF THE INVENTION

The present invention relates to a method for recognizing road signs in the vicinity of a vehicle and for synchronization thereof to road sign information from a digital map.

BACKGROUND INFORMATION

Traffic routes today have a great variety of road signs. In particular, the multitude of signs, also generally referred to as a traffic-sign jungle, make a motor vehicle driver less and less apt to recognize the road signs or more likely to forget the same. Therefore, driver assistance systems have been developed, to be provided in the dashboard, for example, in order to inform the driver of currently valid road signs.

Thus, for example, European Patent No. EP 1 826 736 A1 describes a vehicle having a road-sign recognition device which includes a camera, a control device for determining a potential road sign contained in the camera image and/or the regulatory content thereof, and a display for outputting a representation of the road sign or information relating to the regulatory content thereof.

Moreover, the German Patent Application No. DE 10 2007 048 842 A describes a driver assistance system for signaling wrong-way driving. The control device it describes includes an input for receiving image information captured by a camera, the image information relating to specific objects in the vicinity of the vehicle, whose front view differs from its rear view. An evaluation component is also provided for analyzing the image information in order to identify the front and rear views of the particular objects, as is a decision component for deciding if an output signal is to be generated on the basis of the information ascertained by the evaluation component, the output signal relating to the correctness of the momentary vehicle driving direction.

Besides a camera, a digital map is frequently used as well to determine the currently valid road sign. However, such a digital map quickly becomes outdated since road signs used for road traffic are frequently changed. This is attributable, for example, to modifications to the road routing, fluctuating traffic densities, and road maintenance work, etc.

Current systems, which assist the driver during a vehicle, in particular motor vehicle trip, provide for all possible information to be communicated to the driver. From all of this information, the driver is able to assess the momentary situation and adapt his/her driving behavior accordingly.

Conventionally, the use of a digital map and a camera are combined in various fields and implementations. Thus, for example, International Patent Application No. WO 2000/016214 A describes a method, respectively a coupled system used in road-sign recognition and navigation that permits a bidirectional data transmission between a road-sign recognition device and a navigation device. Thus, information can be exchanged between the two systems.

In all of these conventional devices and methods, it has proven to be disadvantageous that contradictory information from the map and recognition device cannot be optimally processed due, for example, to obsolescing map information or because the reliability determination made by the road-sign recognition device is typically not adapted to the ambient situation.

SUMMARY

An object of the present invention is to provide unambiguous and the most accurate possible and thus improved road sign information to be output to the driver. It is also an object of the present invention to provide a device for that purpose, as well as a computer program product.

In accordance with the present invention, in the case of a discrepancy between the road-sign data derived from the map data and the road-sign recognition data, the decision is made with the aid of at least one reliability factor as to whether the road-sign data from the digital map or the road-sign recognition data are output in the vehicle, no road sign data being output in the vehicle in response to the existence of road sign data from the digital map indicated by the information "road sign present" having a lower reliability factor and the existence of road-sign recognition data indicated by the information "no road sign present" having a higher reliability factor.

In this context, in consideration of both the road sign data derived from the map data and the road-sign recognition data, it is provided for at least one reliability factor to be assigned to the road-sign data and/or to the road-sign recognition data, and for a logic to decide whether the data from the digital map or the road-sign recognition data are output in the vehicle, and, in fact, particularly in the case of a discrepancy between the road sign data derived from the digital maps and the road sign recognition data.

The method according to the present invention is especially beneficial when road signs are only present from the map data, and the road-sign recognition data do not recognize any road signs. In the case of a high reliability, the decision is then made not to output any sign in the vehicle.

In an example method according to the present invention for recognizing road signs in the vicinity of a vehicle and for synchronization thereof to road sign information from a digital map, road-sign recognition data are generated, in particular by a camera, in response to a recognition of traffic signs. Moreover, navigation data are provided for localizing the vehicle in digital map data. The road-sign recognition data are reconciled with the map data and, in the case of a discrepancy between the road-sign data derived from the map data and the road-sign recognition data, at least one reliability factor is assigned to the road-sign data and/or to the road-sign recognition data, and a logic decides whether the data from the digital map or the road-sign recognition data are output in the vehicle.

Nowadays, it is customary for at least some traffic signs and for all speed-related traffic signs to be entered, respectively stored in a digital map, respectively in the map material. However, it is equally possible and, in the future, also provided for "all" road signs to be stored in, respectively entered into digital maps. These data are synchronized to the data from the camera recognition.

The road sign data derived from the map material may be actually assigned to any potential road signs, or it may also be possibly inferred therefrom that a vehicle is located on a particular type of road, such as a parkway, national highway, etc., and thereby be assigned speed limitations, for example. Moreover, due to the road situation, such as a particular clearance height or the like, it would also be possible for these limitations to be inferable from the map material and assignable to a corresponding road sign.

The camera's reliability factor provides a reference point for the recognition probability thereof. It describes, so to speak, the camera's recognition capabilities, respectively the viewing conditions thereof. Given ideal viewing conditions and good weather, the reliability factor is high. In good weather, the camera is more likely to be believed. When the weather is poor (fog, heavy rainfall or snow) and at night, the camera's reliability factor decreases.

The camera's reliability factor is worse, respectively is poor in bad weather and on a winding road, for example.

The values that affect this camera reliability may be empirically determined and reconciled with empirical values from on-road testing. To this end, all of the available sensors in the automobile, for example, that permit mapping of the current situation/surroundings, may be used.

Determining the threshold between high and low reliability is a parameterization task, and it must be performed by on-road testing as a function of the type of camera.

Thus, one preferred specific embodiment of the present invention provides for the decision to be made in each instance with the aid of reliability factors for the camera and the map, as to whether the road-sign recognition data or the map data are more likely to be considered relevant. The reliability factor of the camera is preferably determined by the ambient situation; the reliability factor of the map data, for example, by the age of the data.

Thus, a better mapping of the actual situation and, consequently, in some instances also an improved adaptation of assistance systems, such as route guidance and driving situation recommendations, for example, may be achieved in accordance with the present invention. This enables the driver to also have greater confidence in the same. The quality of the system may be significantly enhanced in view of the fact that the digital maps are often obsolete because the customer does not continually update them or because the road sign situation constantly changes.

In an example method according to the present invention, the road-sign recognition data are preferably obtained via a camera.

The up-to-dateness of the map constitutes one reliability factor of the map data, for example. This is the age of the digital map, for example. Thus, if the digital map is already older, i.e., if one or two updates are overdue, then the reliability factor is lower, and, in some instances, the map information is not considered to the degree that the up to date map data are.

There is preferably still one further reliability criterion for the camera, namely, its age, for example. If a relatively old camera is used for road-sign recognition, this may lead to a lower reliability factor. In a method in accordance with the present invention, a reliability factor of the camera may preferably encompass one or a plurality of the factors vehicle speed, weather, time of day, outside-air temperature, driving-environment conditions, the number of traffic lanes, and/or the age of the camera.

In accordance with one preferred specific embodiment of the present invention, the data for determining the reliability factor may be obtained from vehicle sensors.

The example method in accordance with the present invention may be particularly effective when the road signs are speed-limit signs. However, all other road signs may also be verified.

In conventional methods heretofore, cameras for use in road-sign recognition have gained acceptance. However, depending on the particular situation, cameras may also provide incomplete recognitions. In the method according to the present invention, however, an improvement may be gained since, for example, erroneous or non-existent speed limits in the digital map are either confirmed or suppressed, respectively corrected by a situation-adapted assessment of the camera-recognition quality.

In order to determine such a reliability factor, the ambient situation, such as vehicle speed, light, weather, etc., is also taken into account, for example.

However, if the camera does not recognize any road sign, for example, but its reliability factor is low, and the digital map is old, and its reliability factor is, therefore, also low, a road sign would nevertheless be indicated if the digital map specifies a road-sign, since this should also be indicated to the driver for safety reasons. Thus, the logic provided for this purpose determines the balance between the most disparate situations.

A few exemplary situations are provided in the following for further clarification.

The map data are new, and the weather is good. This means that the reliability factors of the two components are high. In the case that the camera does not recognize anything, but the map data specify a road sign, no road sign is indicated to the driver. However, if only the camera recognizes a road sign, then a road sign is indicated to the driver.

If the weather is good, and the map data are old, and the camera recognizes a road sign, then a road sign is indicated. If the camera does not recognize any road sign, then no road sign is indicated, even if the map specifies a road sign, since the reliability of the camera is high.

If the following situation arises, namely that the map data are up-to-date, but the weather and, in particular, the viewing conditions for the camera are poor, then the camera does not recognize anything, and the map specifies a road sign, a road sign is then indicated to the vehicle driver.

Thus, if both the map data are no longer up-to-date and the weather, thus the viewing conditions for the camera are poor, then both the camera, as well as the map data have a low reliability factor. If, in such a situation, the map data specify a road sign, or the camera recognizes a road sign, then a road sign is indicated since neither has an overriding reliability.

Moreover, in accordance with the present invention, an example device is also provided for recognizing road signs in the vicinity of a vehicle and for synchronizing the same to road sign information from a digital map. The example device features a road sign recognition device for providing road-sign recognition data and a navigation device for providing navigation data, digital map material being provided for mapping the navigation data. In one data synchronization device, the road-sign recognition data are synchronized to the road sign data derived from the map data, and an arrangement is provided which, in the case of a discrepancy between the road sign data derived from the map data and the road-sign recognition data, assign at least one reliability factor to the road sign data and/or to the road-sign recognition data, and a logic decides whether the data from the digital map or the road-sign recognition data are output in the vehicle, and, in addition, an arrangement is provided for outputting the data in the vehicle.

Moreover, in accordance with the present invention, a computer program product is also provided which also generates program components for executing a method described in greater detail above, and a machine-readable, in particular computer-readable data structure using a method described in greater detail above and/or at least one computer program product.

The exemplary embodiment of the present invention is explained in greater detail below with reference to the figures.

DETAILED DESCRIPTION OF EXAMPLE EMBODIMENTS

The curves illustrated in FIG. 1 below points 3 and 4 represent a pulse since a road-sign recognition on the part of the camera takes place only during one point in time and not over a certain time period. For the example method according to the present invention, it is merely important that the camera have recognized or have not recognized a road sign at a certain point in time (+ one tolerance in seconds or meters).

Figure 1:
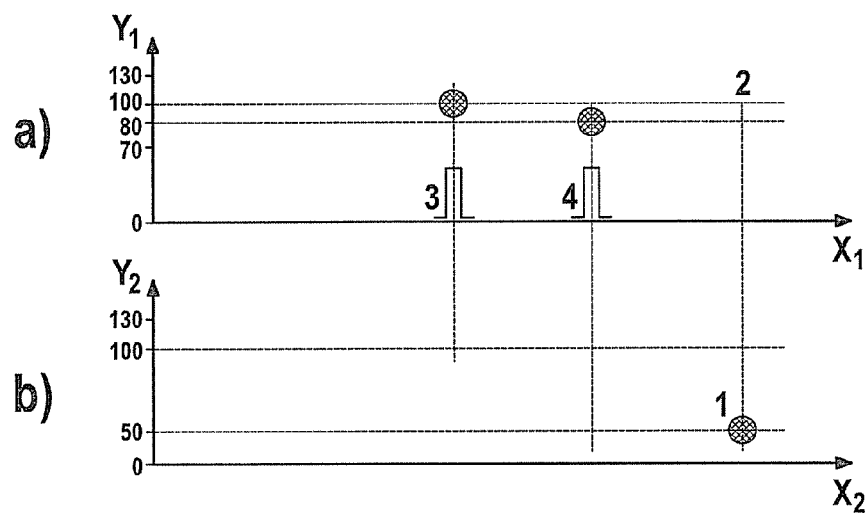
FIG. 1 is a diagram in which a), a detected speed sign (km/h) Y1 is plotted over a current vehicle position (m/s) X1 and, in which b), a speed limitation (km/h) Y2 included in the digital map is plotted over a current vehicle position (m/s) X2.

As illustrated in FIG. 1, the following situation may arise during operation of a motor vehicle. In a specific vehicle situation and vehicle position, a road sign is indicated in the digital map of the navigation system of the vehicle. This is illustrated in FIG. 1b) by a reference numeral 1 in the diagram. However, it is precisely in this situation that the vehicle's camera does not recognize any road sign, respectively any still valid road sign. This is illustrated in FIG. 1a) by reference numeral 2.

Figure 2:
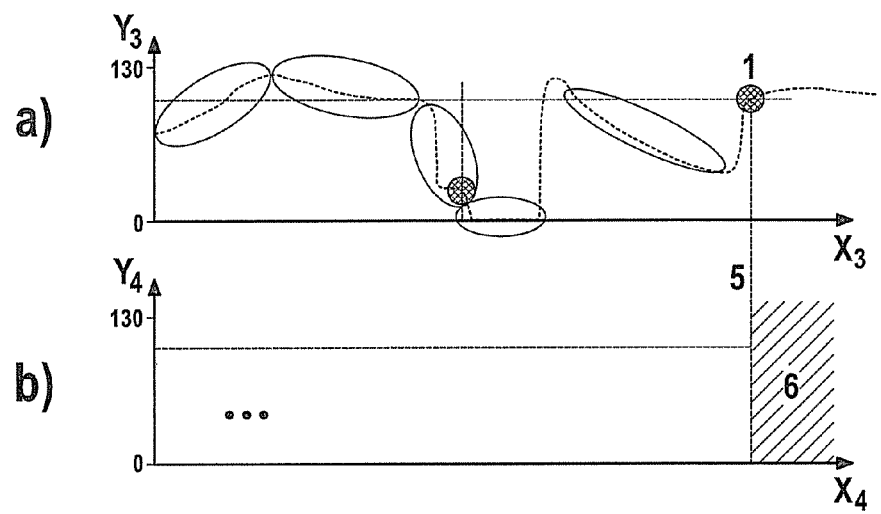
FIG. 2 shows a diagram in which a), the reliability of camera Y3 is plotted over a current vehicle position (m/s) X3, and, in which b), speed limitation (km/h) Y4 indicated to the driver is plotted over a current vehicle position (m/s) X4.

In FIG. 2, a diagram is shown; in a), the reliability of camera Y3 being plotted over a current vehicle position (m/s) X3, and, in b), speed limitation (km/h) Y4 indicated to the driver being plotted over a current vehicle position (m/s) X4.

The camera's reliability factor, which is determined from the factors named below, provides a reference point for its recognition probability. It describes, so to speak, the recognition capabilities. Given ideal viewing conditions and good weather, the reliability factor is high. The reliability factor is worse, respectively is poor in bad weather and on a winding road, for example.

FIG. 2b) illustrates the fusion of the data from both sensors, namely from the camera and the digital map, and the indication associated therewith of the road sign/speed limit sign to the driver.

The three points signify that this time interval is not taken into consideration because, here, it is not necessarily of interest to the present invention, and it simplifies the representation.

Starting from transversal line 5 shown in the diagram, there is a speed limit in the digital map (navigation data). However, at this point in time, no speed limit, including a certain tolerance, has been detected on the part of the camera.

With the aid of the reliability obtained from FIG. 2a) during the given point in time, a high reliability is assigned to the camera in this example. Therefore, due to this high reliability, no speed limit is indicated to the driver, which is illustrated as hatched area 6 in FIG. 2b), although a speed limit is drawn into the digital map.

Thus, in such a procedure, it is assumed that, at a given point in time, the camera, due to the high reliability thereof, would have recognized a sign if one had been there. Thus, the assumption is that this is a question of a potentially obsolete digital map in which, for example, there is still a speed limit, although one no longer exists.

The reliability indicated in FIG. 2a) at position 1 corresponds to the reliability calculated from certain factors at a certain point in time. It is used to assess the reliability of the camera recognition/non-recognition at a given point in time. The position on the abscissa (in meters or seconds) is derived from the value (in meters or seconds) at which, in Illustration 1, a road sign/speed limit sign is recognized on the part of the digital map, and no road sign/speed limit sign was recognized on the part of the camera recognition.

It is thus ensured that the reliability of the camera at the same point in time (+ tolerance) is used as a possible camera non-recognition.

In this regard, the present invention has been described here exemplarily for speed limitations. However, it may also be used analogously for all other possible road signs.

In this connection, the camera's reliability factor is determined from one or a plurality of factors from the group that includes vehicle speed;
weather, whether it is snowing or raining, light conditions (sunny, overcast, glare from the sun . . . );
time of day, whether it is light or dark;
outside-air temperature;
driving-environment conditions, such as woods, village, coastal or alpine region, curve or intersection;
number of traffic lanes;
parallel streets;
cornering;
lane change on the expressway;
age of the camera.

The values for calculating the reliability factor are obtained from sensors present in the vehicle, such as rain sensors, temperature sensors, speed sensors, etc., for example.

What is claimed is:

1. A computer-implemented method for recognizing road signs in a vicinity of a vehicle and for synchronizing to road sign information from a digital map, comprising:

generating road-sign recognition data that indicates whether a road sign exists;

providing navigation data for localizing the vehicle in digital map data;

synchronizing the road-sign recognition data to the map data;

deciding, in the case of a discrepancy between road-sign data derived from the map data and the road-sign recognition data, whether to output in the vehicle the road-sign data from the digital map or the road-sign recognition data in the vehicle, with the aid of at least one reliability factor, wherein the reliability factor is independent of the discrepancy between the road-sign data derived from the map data and the road-sign data recognition data, and provides a reference point for the recognition probability of the road-sign recognition data; and outputting road-sign data in the vehicle based on the deciding, wherein road-sign data derived from the road-sign recognition data is output irrespective of the road-sign data derived from the map data when a reliability factor of the road-sign recognition data is high;

wherein at least one of the operations is performed by a processor; and wherein when there exists a discrepancy between the road-sign data derived from the map data and the road-sign recognition data, and both the reliability factor of the road-sign recognition data and a reliability factor of the map data are low, the road-sign data is output based on whichever one of the map data and the road-sign recognition data indicates an existence of a road sign.

2. The method as recited in claim 1, wherein the reliability factor relates to a reliability of at least one of the road sign recognition and of the digital map.

3. The method as recited in claim 1, wherein the reliability factor encompasses at least one of the following factors: vehicle speed, weather, time of day, outside air temperature, driving-environment conditions, number of traffic lanes, and age of a camera of the vehicle.

4. The method as recited in claim 1, wherein values for determining the reliability factor are obtained from vehicle sensors.

5. The method as recited in claim 1, wherein the road sign is a speed limitation road sign.

6. The method as recited in claim 1, wherein the reliability factor of the map data is based on an age of the map data.

7. A device for recognizing a road sign in a vicinity of a vehicle and for synchronizing to road sign information from a digital map, comprising:
    a road-sign recognition device to provide road-sign recognition data that indicates whether a road sign exists;
    a navigation device for providing navigation data, digital map material being provided for mapping the navigation data;
    a data synchronization device to synchronize the road-sign recognition data to road sign data derived from the map data;
    an arrangement in the case of a discrepancy between the road sign data derived from the map data and the road-sign recognition data, decides with the aid of reliability factors for a camera of the vehicle, wherein the reliability factor is independent of the discrepancy between the road-sign data derived from the map data and the road-sign data recognition data, and provides a reference point for the recognition probability of the road-sign recognition data; and
    an output device to output road-sign data in the vehicle, wherein the output device outputs road-sign data derived from the road-sign recognition data irrespective of the road-sign data derived from the map data when a reliability factor of the road-sign recognition data is high; and
    wherein when there exists a discrepancy between the road-sign data derived from the map data and the road-sign recognition data, and both the reliability factor of the road-sign recognition data and a reliability factor of the map data are low, the output device outputs the road-sign data based on whichever one of the map data and the road-sign recognition data indicates an existence of a road sign.

8. The device as recited in claim 7, wherein the reliability factor relates to a reliability of at least one of the road sign recognition and of the digital map.

9. The device as recited in claim 7, wherein the reliability factor encompasses at least one of the following factors: vehicle speed, weather, time of day, outside air temperature, driving-environment conditions, number of traffic lanes, and age of a camera of the vehicle.

10. The device as recited in claim 7, wherein values for determining the reliability factor are obtained from vehicle sensors.

11. The device as recited in claim 7, wherein the road sign is a speed limitation road sign.

12. The device as recited in claim 7, wherein the reliability factor relates to a reliability of at least one of the road sign recognition and of the digital map, and wherein values for determining the reliability factor are obtained from vehicle sensors.

13. The device as recited in claim 12, wherein the road sign is a speed limitation road sign.

14. The device as recited in claim 7, wherein the reliability factor encompasses at least one of the following factors: vehicle speed, weather, time of day, outside air temperature, driving-environment conditions, number of traffic lanes, and age of a camera of the vehicle, and wherein values for determining the reliability factor are obtained from vehicle sensors.

15. The device as recited in claim 14, wherein the road sign is a speed limitation road sign.

16. The method as recited in claim 7, wherein the reliability factor of the map data is based on an age of the map data.

17. A non-transitory computer readable medium storing a computer program, which is executable by a computer, comprising:
    a program code arrangement having program code for performing the following:
    generating, road-sign recognition data that indicates whether a road sign exists;
    providing navigation data for localizing the vehicle in digital map data;
    synchronizing the road-sign recognition data to the map data;
    deciding, in the case of a discrepancy between road-sign data derived from the map data and the road-sign recognition data, whether to output in the vehicle the road-sign data from the digital map or the road-sign recognition data in the vehicle, with the aid of at least one reliability factor, wherein the reliability factor is independent of the discrepancy between the road-sign data derived from the map data and the road-sign data recognition data, and provides a reference point for the recognition probability of the road-sign recognition data; and
    outputting road-sign data in the vehicle based on the deciding, wherein road-sign data derived from the road-sign recognition data is output irrespective of the road-sign data derived from the map data when a reliability factor of the road-sign recognition data is high; and
    wherein when there exists a discrepancy between the road-sign data derived from the map data and the road-sign recognition data, and both the reliability factor of the road-sign recognition data and a reliability factor of the map data are low, the road-sign data is output based on whichever one of the map data and the road-sign recognition data indicates an existence of a road sign.

18. The computer readable medium as recited in claim 17, wherein the reliability factor relates to a reliability of at least one of the road sign recognition and of the digital map.

19. The computer readable medium as recited in claim 17, wherein the reliability factor encompasses at least one of the following factors: vehicle speed, weather, time of day, outside air temperature, driving-environment conditions, number of traffic lanes, and age of a camera of the vehicle.

20. The computer readable medium as recited in claim 17, wherein values for determining the reliability factor are obtained from vehicle sensors.

21. The computer readable medium as recited in claim 17, wherein the road sign is a speed limitation road sign.

22. The computer readable medium as recited in claim 17, wherein the reliability factor relates to a reliability of at least one of the road sign recognition and of the digital map, and wherein values for determining the reliability factor are obtained from vehicle sensors.

23. The computer readable medium as recited in claim 22, wherein the road sign is a speed limitation road sign.

24. The computer readable medium as recited in claim 17, wherein the reliability factor encompasses at least one of the following factors: vehicle speed, weather, time of day, outside air temperature, driving-environment conditions, number of traffic lanes, and age of a camera of the vehicle, and wherein values for determining the reliability factor are obtained from vehicle sensors.

25. The computer readable medium as recited in claim 24, wherein the road sign is a speed limitation road sign.

26. The method as recited in claim 17, wherein the reliability factor of the map data is based on an age of the map data.

* * * * *